United States Patent
Choi et al.

(10) Patent No.: US 7,154,681 B2
(45) Date of Patent: Dec. 26, 2006

(54) SUBMINIATURE OPTICAL SYSTEM

(75) Inventors: Yun Seok Choi, Kyungki-do (KR); Ho Seop Jeong, Kyungki-do (KR); Chon Su Kyong, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/177,308

(22) Filed: Jul. 11, 2005

(65) Prior Publication Data

US 2006/0087748 A1 Apr. 27, 2006

(30) Foreign Application Priority Data

Oct. 25, 2004 (KR) .................. 10-2004-0085316

(51) Int. Cl.
*G02B 13/18* (2006.01)

(52) U.S. Cl. ..................... 359/716; 359/784
(58) Field of Classification Search ............. 359/716, 359/784

See application file for complete search history.

(56) References Cited

U.S. PATENT DOCUMENTS 6,476,982 B1  11/2002  Kawakami
2003/0184883 A1*  10/2003  Sato et al. .......... 359/784

* cited by examiner

*Primary Examiner*—Scott J. Sugarman
(74) *Attorney, Agent, or Firm*—Lowe Hauptman & Berner, LLP.

(57) ABSTRACT

A subminiature optical system used in a subminiature image sensor module is provided. The subminiature optical system has a first lens group, a second lens group and a third lens group sequentially arranged from the object side. The first lens group has a first lens of plus refractive power and a second lens of minus refractive power, the second lens being cemented to the first lens. The second lens group has a third lens where at least one refraction surface is aspherical and has minus refractive power. The third lens group has a fourth lens where at least one refraction surface is aspherical and has minus refractive power. The subminiature optical system can have a high resolution and a compact-sized lens construction with a small number of lens combinations. Also, the subminiature optical system can have a small dimension of an axial direction in a whole construction.

8 Claims, 8 Drawing Sheets

SUBMINIATURE OPTICAL SYSTEM

RELATED APPLICATION

The present application is based on, and claims priority from, Korean Application Number 2004-0085316, filed Oct. 25, 2004, the disclosure of which is hereby incorporated by reference herein in its entirety.

BACKGROUND OF THE INVENTION

1. Field of the Invention

The present invention relates to a subminiature optical system, and more particularly, to a subminiature optical system used in a subminiature image sensor module adopting a high resolution image pickup element such as a charge coupled device (CCD) or a complementary metal oxide semiconductor (CMOS) and having a high performance and a small number of lens combinations.

2. Description of the Related Art

Recently, a camera module for use in a communication terminal, a digital still camera (DSC), a camcorder and a personal computer (PC) camera (image pickup device annexed to a PC) is being studied in association with an image pickup system. The most important element of the image pickup system for an image is a lens system for forming an image.

Since the image pickup system requires a high performance in viewpoints of a resolution and an image quality, a lens construction becomes complicated. If the lens construction becomes complicated structurally and optically, the optical system is increased in its size, which is against current trends of a small size and a slim profile.

SUMMARY OF THE INVENTION

Accordingly, the present invention is directed to a subminiature optical system that substantially obviates one or more problems due to limitations and disadvantages of the related art.

An object of the present invention is to provide a subminiature optical system used in a subminiature image sensor module adopting a high resolution image pickup element such as a charge coupled device (CCD) or a complementary metal oxide semiconductor (CMOS) and having a high performance, a small number of lens combinations, and a small dimension of an optical axial direction in the whole lens system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a subminiature optical system having an aperture stop arranged closest to an object side, which includes, sequentially from the object side: a first lens group having a first lens of plus refractive power and a second lens of minus refractive power, the second lens being cemented to the first lens; a second lens group having a third lens where at least one refraction surface is aspherical and has minus refractive power; and a third lens group having a fourth lens where at least one refraction surface is aspherical and has minus refractive power, in which the following Equations are satisfied.

That is, there is provided a subminiature optical system such that: a refractive power of the first lens group satisfies the following Equation 1, a dimension of the optical axial direction of the whole lens system satisfies the following Equation 2, a shape of an object side of the first lens satisfies the following Equation 3, an abbe number of the first and the second lenses provided to the first lens group satisfies the following Equation 4, a refractive power of the second lens group satisfies the following Equation 5, a shape of an object side of the third lens provided to the second lens group satisfies the following Equation 6, a refractive power of the third lens group satisfies the following Equation 7, a shape of an object side of the fourth lens provided to the third lens group satisfies the following Equation 8, in which:

$$0.5 < f_I/f < 0.8 \quad \text{Equation 1}$$

$$TL/f < 1.45 \quad \text{Equation 2}$$

$$0.55 < r_{I\text{-}1}/f < 0.65 \quad \text{Equation 3}$$

$$10 < v_{I\text{-}1} - v_{I\text{-}2} < 25 \quad \text{Equation 4}$$

$$1 < |f_{II}|/f < 20 \quad \text{Equation 5}$$

$$0.2 < |r_{II\text{-}1}|/f < 0.5 \quad \text{Equation 6}$$

$$1 < |f_{III}|/f < 50 \quad \text{Equation 7}$$

$$1 < r_{III\text{-}2}/f < 25 \quad \text{Equation 8}$$

where, $f_I$: composite focal length of the first lens group
f: composite focal length of the whole lens system
TL: distance from an aperture stop up to an image plane
$r_{I\text{-}1}$: radius of curvature for an object side of the first lens
$v_{I\text{-}1}$: abbe number of the first lens
$v_{I\text{-}2}$: abbe number of the second lens
$f_{II}$: composite focal length of the second lens group ($f_{II} < 0$)
$r_{II\text{-}1}$: radius of curvature for an object side of the third lens ($r_{II\text{-}1} < 0$)
$f_{III}$: composite focal length of the third lens group ($f_{III} < 0$)
$r_{III\text{-}2}$: radius of curvature for an image side of the fourth lens It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
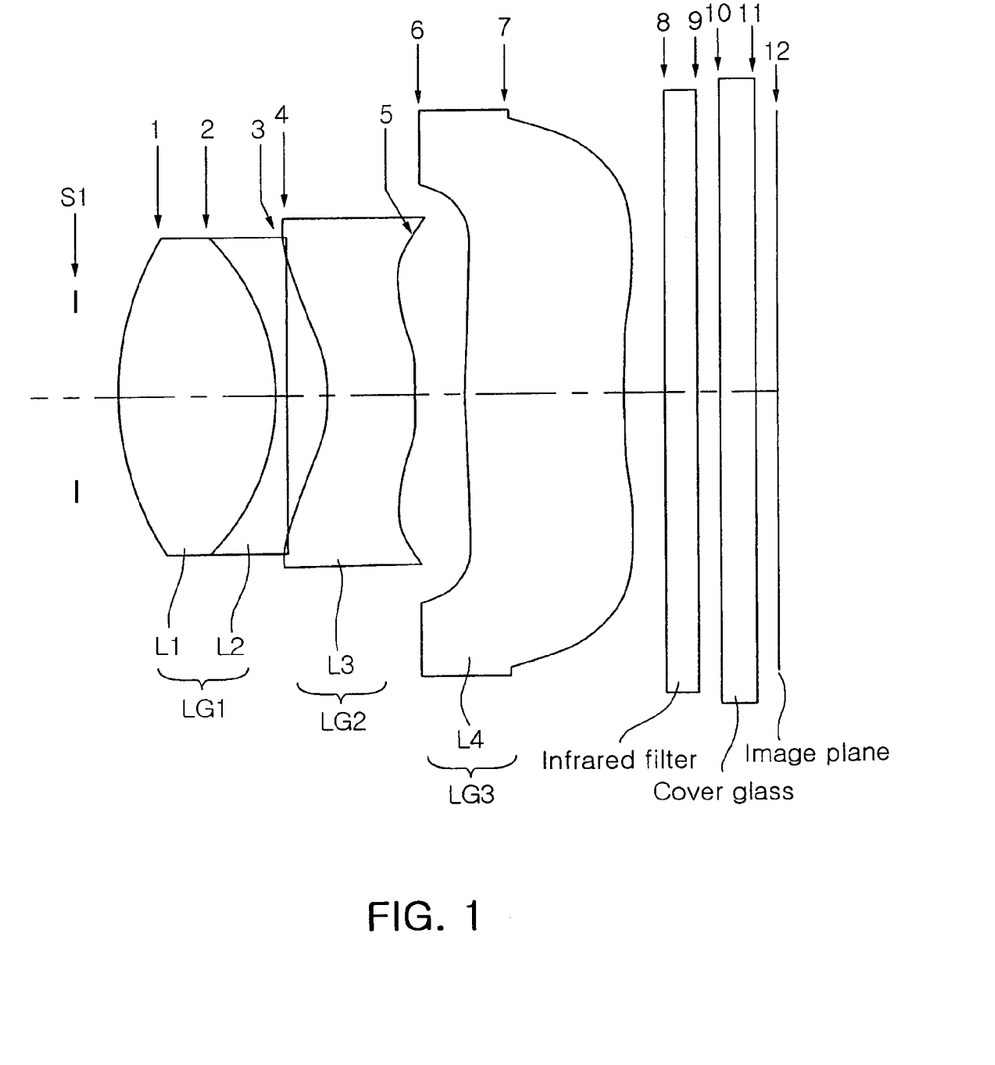
FIG. 1 is a view for a lens construction of a first embodiment of a subminiature optical system according to the present invention.

FIG. 1 is a view for a lens construction of a first embodiment of a subminiature optical system according to the present invention.

Referring to FIG. 1, a subminiature optical system of the present invention has an aperture stop S1 arranged closest to an object side. The subminiature optical system includes a first lens group LG1 having a big plus refractive power, a second lens group LG2 having minus refractive power, and a third lens group LG3 having minus refractive power, which are sequentially arranged from the object side. The first lens group LG1 has a primary refractive power of the whole lens system so that a total length of the lens may be shortened.

In connection with aberration correction, the first lens group LG1 includes, sequentially from an object side: a first lens L1 having plus refractive power; and a second lens L2 cemented to the first lens L1 and having minus refractive power, so that a spherical aberration, a comatic aberration, a chromatic aberration are corrected.

Further, at least one refraction surface of the third lens L3 provided to the second lens group LG2 is made aspherical and its object side is formed by a concave meniscus lens, so that a comatic aberration, astigmatism are mainly corrected properly. Still further, at least one refraction surface of a fourth lens L4 provided to the third lens group LG3 is made aspherical, so that distortion aberration is properly corrected.

In the meantime, an infrared filter and a cover glass are installed in a rear side of the third lens group LG3 in correspondence to an optical low-pass filter, a color filter, or a face plate, but the infrared filter and the cover glass may be replaced by other filter if necessary, and do not have an influence, in principle, on an optical property of the present invention.

A solid image pickup element (photoelectric transformation element) of a high resolution consisting of a CCD sensor or a CMOS sensor and having an image plane (photosensitive plane) 12 for receiving an image formed by a lens is arranged in a rear side of the cover glass.

Under the above-described overall construction, effects of the following Equations 1 through 8 will now be described.

$$0.5 < f_I/f < 0.8 \quad \text{Equation 1}$$

$$TL/f < 1.45 \quad \text{Equation 2}$$

where $f_I$: composite focal length of the first lens group LG1 f: composite focal length of the whole lens system

TL: distance from the aperture stop S1 up to an image plane

The Equation 1 prescribes a refractive power of the first lens group LG 1. If $f_I$ becomes big beyond an upper limit of the Equation 1, refractive powers of the second lens group LG2 and the third lens group LG3 consisting of a single lens should be increased. As a result, a chromatic aberration is increased. Conversely, if $f_I$ becomes small below a lower limit of the Equation 1, a refractive power of the first lens group LG1 gets excessively big so that a spherical aberration and a comatic aberration become big and also a radius of curvature of a spherical plane of a lens constituting the first lens group LG1 gets small so that the lens is difficult to process.

The Equation 2, which prescribes the total length of the lens, is a condition for manufacturing a lens in a small size. If an upper limit of the second Equation is exceeded, it is advantageous in viewpoint of correcting aberrations in high image quality but disadvantageous in viewpoint of manufacturing a lens in a small size, which is a characteristics of the present invention.

$$0.55 < r_{I-1}/f < 0.65 \quad \text{Equation 3}$$

$$10 < v_{I-1} - v_{I-2} < 25 \quad \text{Equation 4}$$

where $r_{I-r}$: radius of curvature of an object side of the first lens L1

$v_{I-1}$: abbe number of the first lens L1

$v_{I-2}$: abbe number of the second lens L2

The Equation 3 prescribes a shape of the first lens LG1 and basically corrects a spherical aberration and a comatic aberration. If $r_{I-1}/f$ becomes small below a lower limit of the Equation 3, a spherical aberration is excessively generated and correction is impossible for planes thereafter. Conversely, if $r_{I-1}/f$ becomes big beyond an upper limit of the Equation 3, a principle point's position of a lens is moved to an upper side and thus it is difficult to manufacture a lens in a small size.

The Equation 4 prescribes material of the first lens group LG1. If $v_{I-1} - v_{I-2}$ goes beyond an upper limit of the Equation 4, a mono-chromatic aberration is excessively generated due to deterioration of an index of refraction of a plus lens (lens having plus refractive power). Conversely, if $v_{I-1} - v_{I-2}$ goes beyond a lower limit, powers of the plus lens and the minus lens (lens having minus refractive power) becomes excessively big.

$$1 < |f_{II}|/f < 20 \quad \text{Equation 5}$$

$$0.2 < |r_{II-1}|/f < 0.5 \quad \text{Equation 6}$$

where $f_{II}$: composite focal length of the second lens group LG2 ($f_{II} < 0$)

$r_{II-1}$: radius of curvature of an object side of the third lens L3 ($r_{II-1} < 0$)

The second lens group LG2 is characterized in reducing the power of the first lens group LG1 and correcting off-axis aberration.

If $|f_{II}|$ becomes big beyond an upper limit of the Equation 5, a power burden of the first lens group LG1 becomes excessively big and mainly, aberrations on an axis are difficult to correct. Conversely, if |$f_{II}$| becomes small below a lower limit of the Equation 5, a chromatic aberration by the second lens group LG2 is excessively generated, and optical performance in an off-axis region is particularly deteriorated.

The Equation 6 relates to a shape of the second lens group LG2. It is required that the second lens group LG2 is of a smooth positive meniscus shape on an image side of which is surrounded by a convex surface. If |$r_{II-1}$| goes beyond the upper limit of the Equation 6, an angle of the off-axis chief ray becomes excessively small and correction cannot be made in the third lens group LG3, so that telecentricity is deteriorated. If |$r_{II-1}$| exceeds the lower limit, it is advantageous in viewpoint of telecentricity but optical performance is deteriorated.

$$1 < |f_{III}|/f < 50 \quad \text{Equation 7}$$

$$1 < r_{III-2}/f < 25 \quad \text{Equation 8}$$

where $f_{III}$: composite focal length of the third lens group LG3 ($f_{III} < 0$)

$r_{III-2}$: radius of curvature of an upper side of the fourth lens L4

The third lens group LG3 corrects a distortion aberration or telecentricity of the vicinity.

The Equation 7 relates to the power of the third lens group LG3. If the value exceeds the upper limit and the power becomes small, telephoto ratio of the whole lens system is deteriorated and manufacturing a lens in a small size becomes difficult. Conversely, if the value exceeds the lower limit, it is advantageous in manufacturing a lens in a small size, but it is disadvantageous in viewpoint of telecentricity in the vicinity and a distortion aberration.

The Equation 8 relates to a shape of the vicinity of an axial light bundle and means that a rear surface has minus refractive power. If the value exceeds the upper limit of the Equation 8, the minus refractive power of the rear surface becomes small and it is disadvantageous in manufacturing a lens in a small size. Conversely, if the value exceeds the lower limit, a difference between a shape of the vicinity and that of the center gets big and optical performances gets varied much between the center and the vicinity of an image plane, so that a distortion aberration becomes big.

Numerical embodiment of the present invention will be now described in detail in the following.

As described above, the following first through fourth embodiments have an aperture stop S1 arranged closest to an object side and include, sequentially from the object side: a first lens group LG1 having a first lens L1 and a second lens L2; a second lens group LG2 having a third lens L3; and a third lens group LG3 having a fourth lens L4, in which an infrared filter, a cover glass are provided between the third lens group LG3 and an image plane.

An aspherical surface used in each of the following embodiments is obtained by the following known Equation 1 and E and a number following the E used in a conic constant K and aspherical coefficients A, B, C, and D represent a 10's power. For example, E21 and E-02 represent $10^{21}$ and $10^{-2}$, respectively.

$$Z = (Y^2/r)[1 + \sqrt{1-(1+K)(Y/r)^2}] + AY^4 + BY^6 + CY^8 + DY^{10}$$

Z: distance toward an optical axis from a vertex of a lens
Y: distance toward a direction perpendicular to an optical axis
r: radius of curvature on a vertex of a lens
K: conic constant
A, B, C, and D: aspherical coefficients

[First Embodiment]

The following table 1 represents numerical examples according to a first embodiment of the present invention.

Figure 2A:
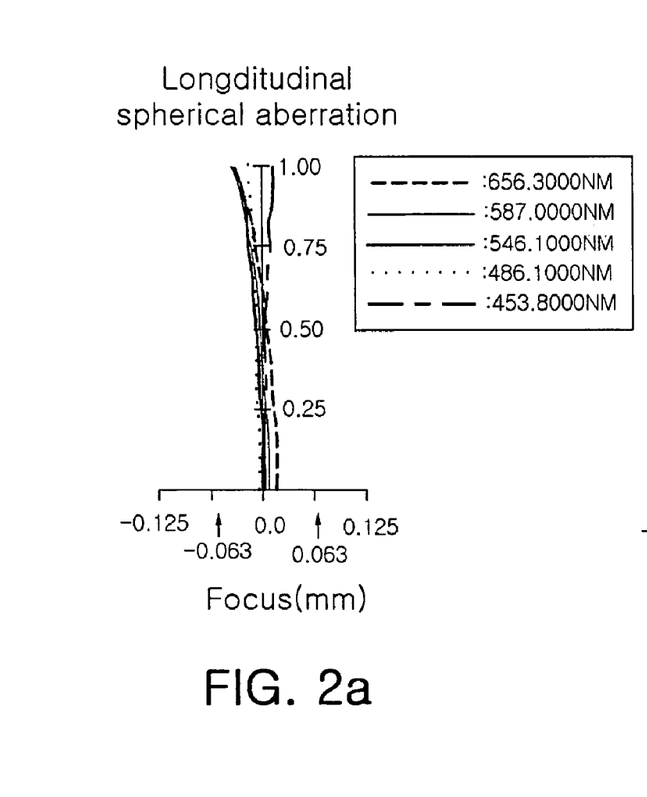
FIG. 2 is a graph explaining aberrations of the first embodiment illustrated in FIG. 1, in which (a), (b), and (c) show a spherical aberration, astigmatism, and distortion, respectively.
Figure 2B:
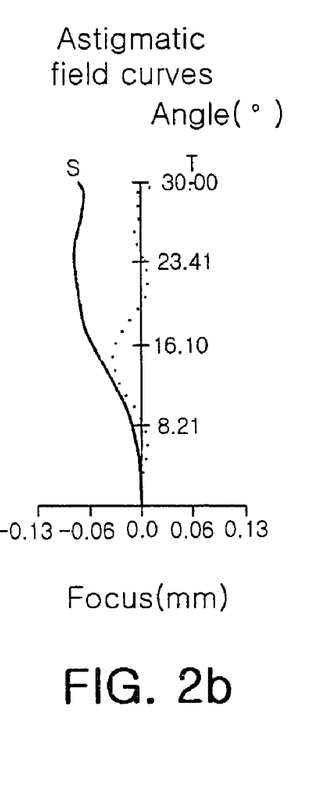
Figure 2C:
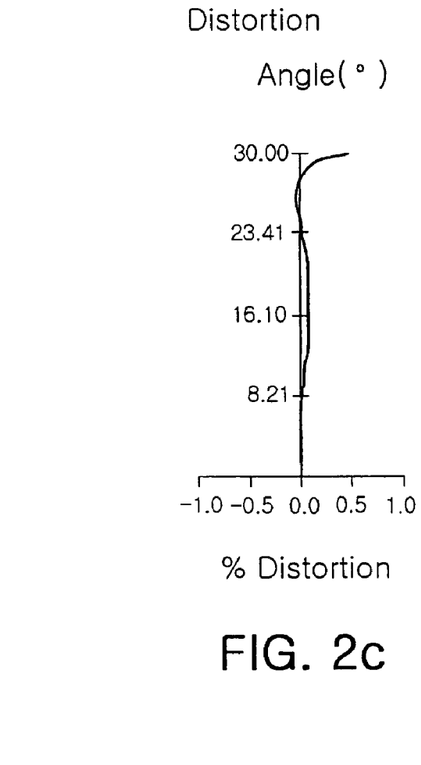

Further, FIG. 1 is a view for a lens construction of a first embodiment of a subminiature optical system according to the present invention, and FIGS. 2A through 2C represent aberrations of an optical system illustrated in table 1 and FIG. 1.

In table 1, "f" represents an effective focal length of the whole lens system, "$F_{No}$" represents a F number, "$2\omega$" represents the whole angle of view for a lens, and "TL" represents a total length from the aperture stop up to an image plane.

Further, in the following drawing illustrating astigmatism, "S" represents sagittal and "T" represents tangential.

TABLE 1

Focal length (f): 8.00 mm
F number ($F_{No}$): 2.8
Angle of view ($2\omega$): 60°
Length from aperture stop to image plane (TL): 11.567 mm

| Plane No. | Radius of curvature (R) | Thickness or distance (t) | Index of refraction ($N_d$) | Abbe number ($v_d$) | Remark |
|---|---|---|---|---|---|
| S1 | ∞ | 0.699894 | — | — | Aperture stop |
| 1 | 4.93233 | 2.600000 | 1.8042 | 46.5 | 1st lens group |
| 2 | −3.68278 | 0.220000 | 1.8052 | 25.5 | |
| 3 | −64.16896 | 0.617214 | — | — | |
| *4 | −2.26731 | 1.482960 | 1.53 | 56 | 2nd lens group |
| *5 | −2.85858 | 0.834626 | — | — | |
| *6 | −872.81890 | 2.598194 | 1.53 | 56 | 3rd lens group |
| *7 | 11.89598 | 0.643065 | — | — | |
| 8 | ∞ | 0.550000 | 1.5168 | 64.2 | Infrared filter |
| 9 | ∞ | 0.385585 | — | — | |
| 10 | ∞ | 0.550000 | 1.5168 | 64.2 | Cover glass |
| 11 | ∞ | 0.385585 | — | — | |
| 12 | ∞ | 0.000000 | — | — | Image plane |

In table 1, * represents an aspherical surface and aspherical coefficients by the Equation 1 are given as follows. Here, a fourth surface (object side of the third lens), a fifth surface (image side of the third lens), a sixth surface (object side of the fourth lens), and a seventh surface (image side of the fourth lens) are aspherical.

Coefficients of the fourth aspherical surface are given by:
K: −3.036816
A: 0.712347E-02
B: 0.128251E-02
C: −0.392010E-03
D: 0.274804E-04

Coefficients of the fifth aspherical surface are given by:
K: −1.272970
A: 0.316559E-01
B: −0.206908E-02
C: 0.135497E-03
D: −0.271882E-05

Coefficients of the sixth aspherical surface are given by:
K: −27424.34265
A: 0.124892E-01
B: −0.307594E-02
C: 0.319345E-03
D: −0.154128E-04

Coefficients of the seventh aspherical surface are given by:
K: −95.013160
A: 0.138854E-02
B: −0.567442E-03
C: 0.330566E-04
D: −0.100075E-05

[Second Embodiment]

The following table 2 represents numerical examples according to a second embodiment of the present invention.

Figure 3:
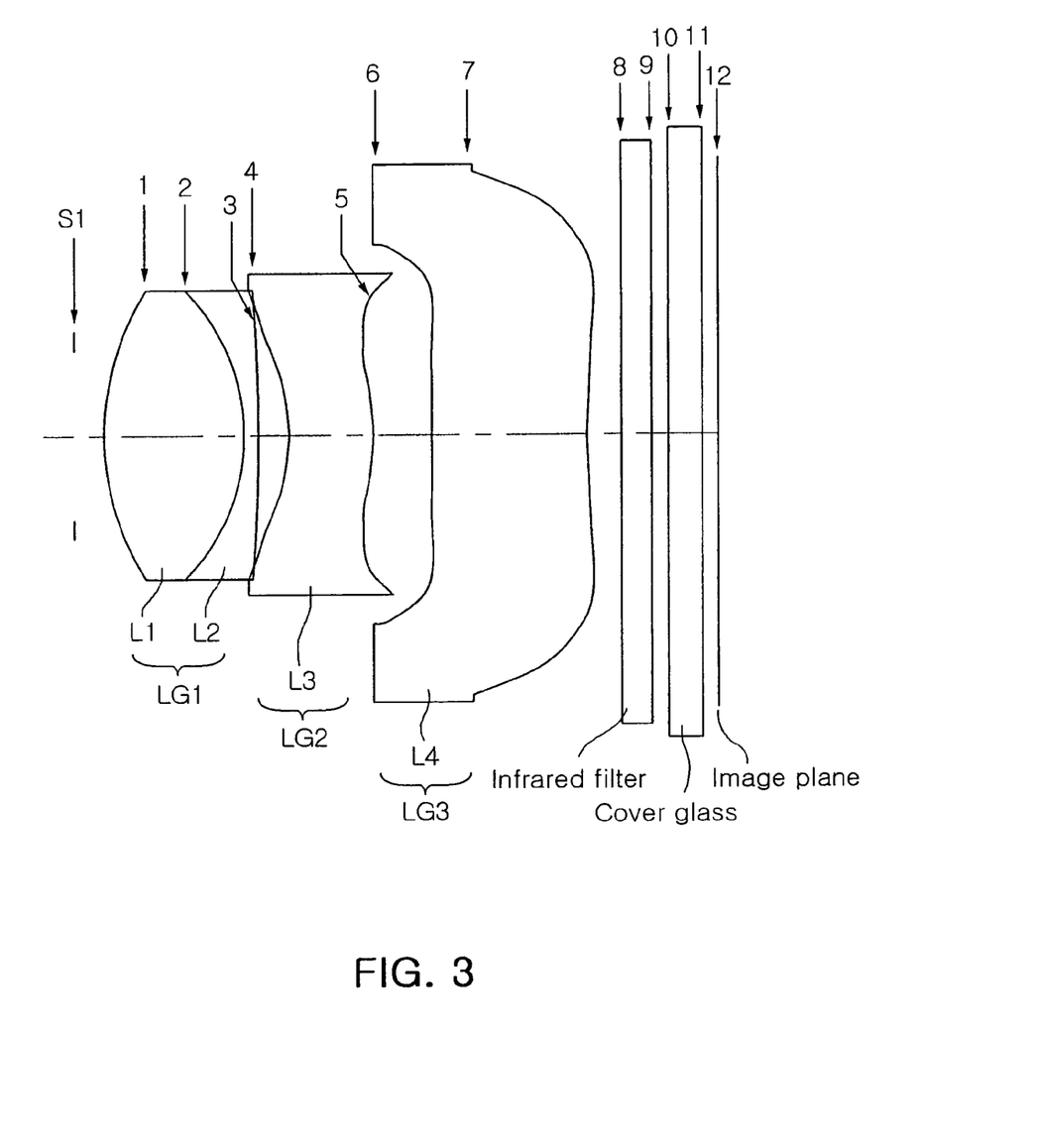
FIG. 3 is a view for a lens construction of a second embodiment of a subminiature optical system according to the present invention.
Figure 4A:
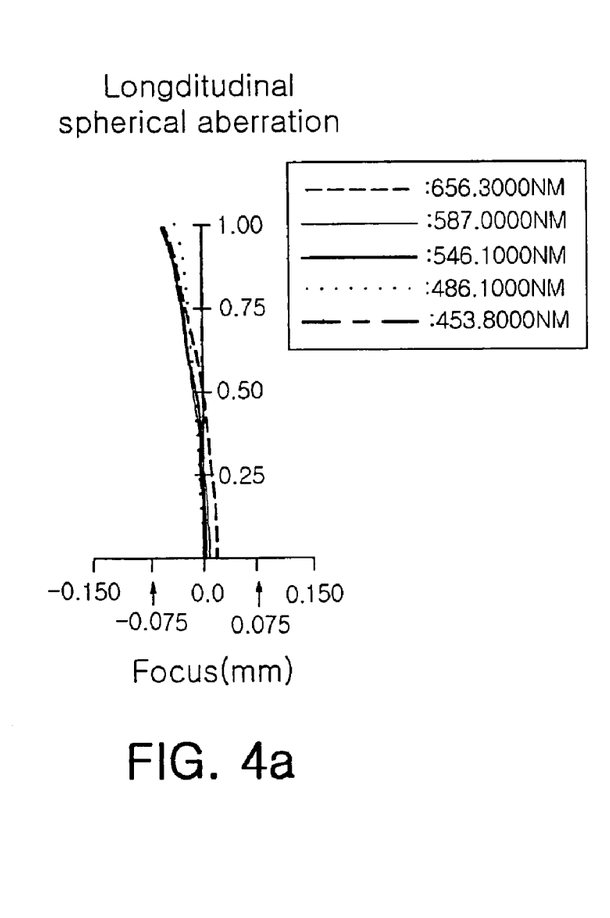
FIG. 4 is a graph explaining aberrations of the second embodiment illustrated in FIG. 3, in which (a), (b), and (c) show a spherical aberration, astigmatism, and distortion, respectively.
Figure 4B:
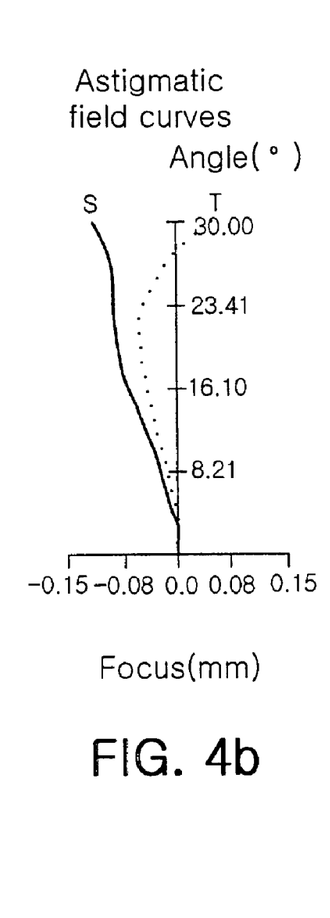
Figure 4C:
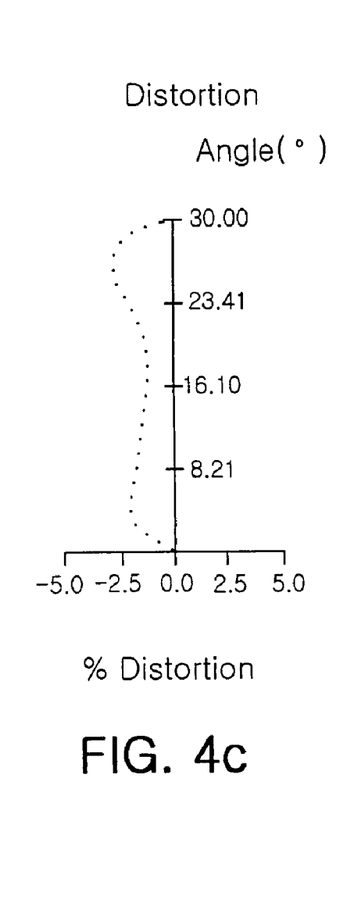

Further, FIG. 3 is a view for a lens construction of a second embodiment of a subminiature optical system according to the present invention, and FIGS. 4A through 4C represent aberrations of an optical system illustrated in table 2 and FIG. 3.

TABLE 2

Focal length (f): 8.00 mm
F number ($F_{No}$): 2.8
Angle of view (2ω): 60°
Length from aperture stop to image plane (TL): 10.741 mm

| Plane No. | Radius of curvature (R) | Thickness or distance (t) | Index of refraction ($N_d$) | Abbe number ($v_d$) | Remark |
|---|---|---|---|---|---|
| S1 | ∞ | 0.480472 | — | — | Aperture stop |
| 1 | 4.63769 | 2.335261 | 1.8042 | 46.5 | 1st lens group |
| 2 | −3.41106 | 0.220000 | 1.8052 | 25.5 | |
| 3 | −32.24985 | 0.526855 | — | — | |
| *4 | −2.37417 | 1.400467 | 1.53 | 56 | 2nd lens group |
| *5 | −3.52166 | 0.983864 | — | — | |
| *6 | −60.81361 | 2.600000 | 1.53 | 56 | 3rd lens group |
| *7 | 14.39375 | 0.536585 | — | — | |
| 8 | ∞ | 0.550000 | 1.5168 | 64.2 | Infrared filter |
| 9 | ∞ | 0.279105 | — | — | |
| 10 | ∞ | 0.550000 | 1.5168 | 64.2 | Cover glass |
| 11 | ∞ | 0.279105 | — | — | |
| 12 | ∞ | 0.000000 | — | — | Image plane |

In table 2, * represents an aspherical surface and aspherical coefficients by the Equation 1 are given as follows. Here, a fourth surface (object side of the third lens), a fifth surface (image side of the third lens), a sixth surface (object side of the fourth lens), and a seventh surface (image side of the fourth lens) are aspherical.

Coefficients of the fourth aspherical surface are given by:
K: −3.634866
A: 0.721197E-02
B: 0.977089E-03
C: −0.397364E-03
D: 0.331645E-04

Coefficients of the fifth aspherical surface are given by:
K: −1.589496
A: 0.322111E-01
B: −0.216236E-02
C: 0.113686E-03
D: −0.399407E-05

Coefficients of the sixth aspherical surface are given by:
K: −0.167246E21
A: 0.923705E-02
B: −0.292572E-02
C: 0.323709E-03
D: −0.201943E-04

Coefficients of the seventh aspherical surface are given by:
K: −153.079210
A: 0.278428E-02
B: −0.805017E-03
C: 0.343410E-04
D: −0.808873E-06

[Third Embodiment]

The following table 3 represents numerical examples according to a third embodiment of the present invention.

Figure 5:
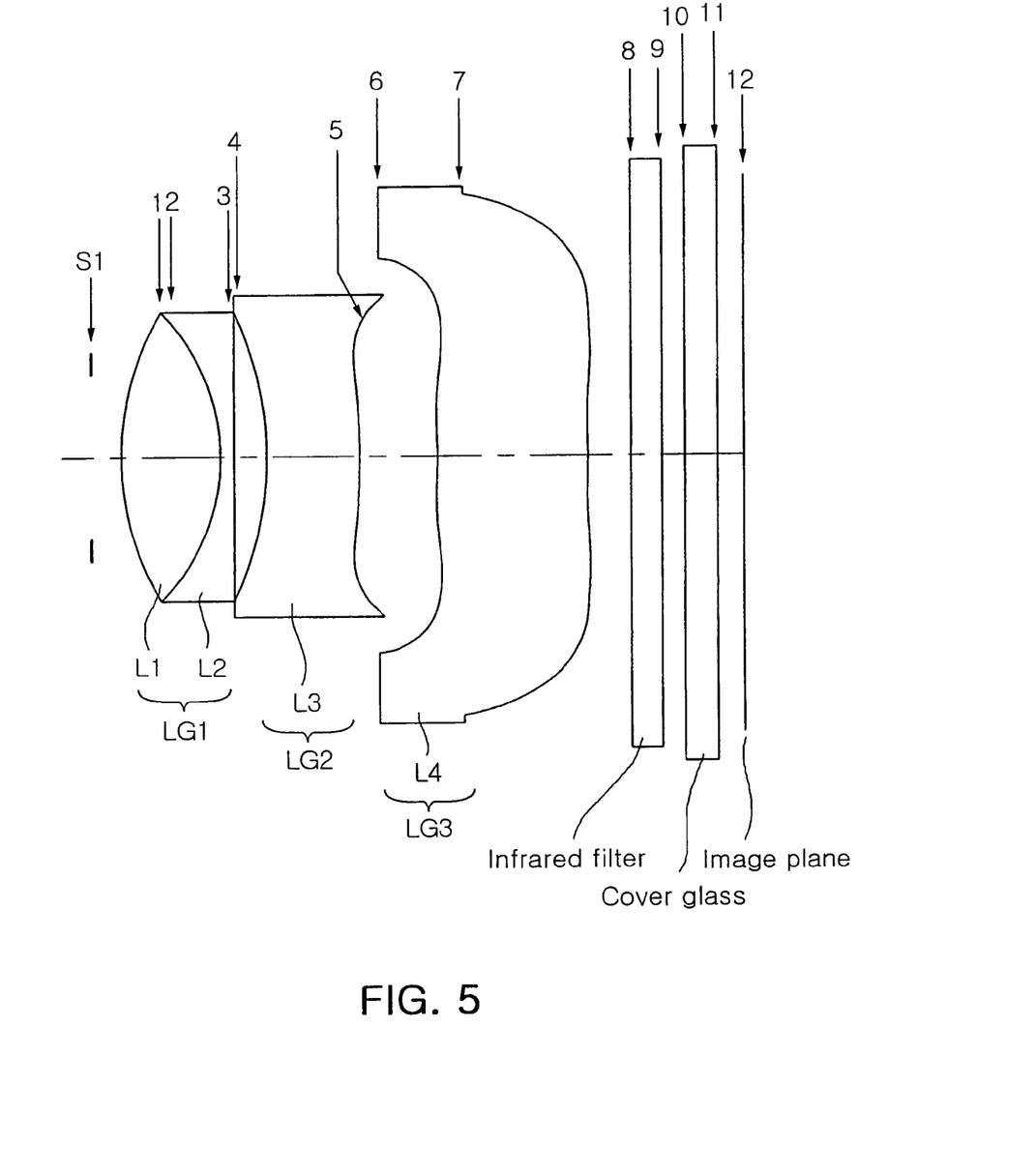
FIG. 5 a view for a lens construction of a third embodiment of a subminiature optical system according to the present invention.
Figure 6A:
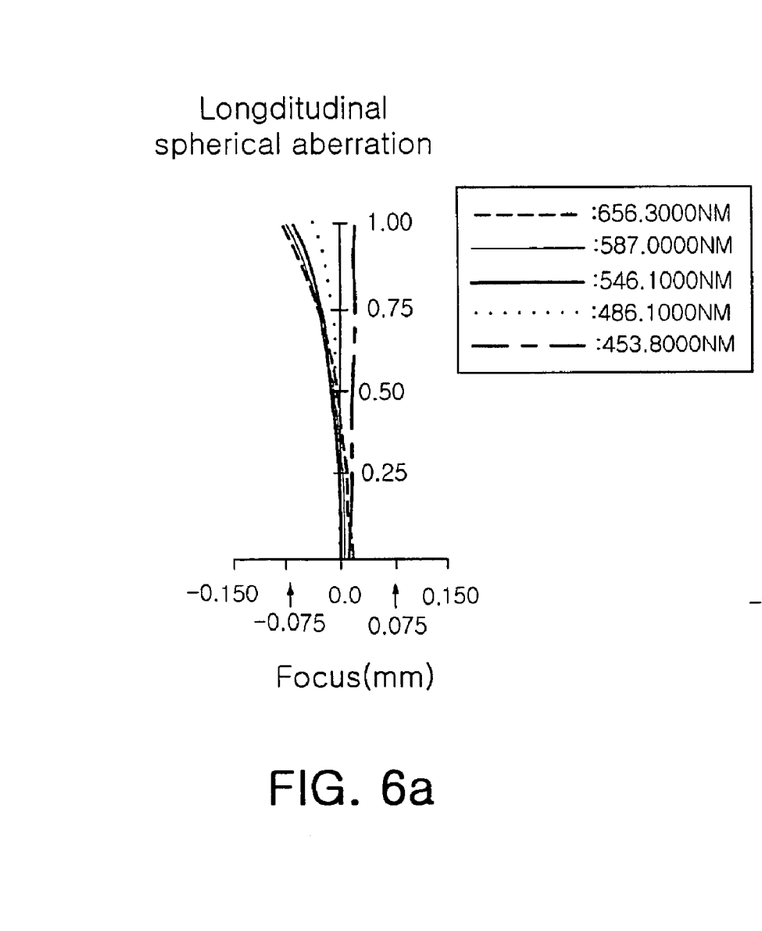
FIG. 6 is a graph explaining aberrations of the third embodiment illustrated in FIG. 5, in which (a), (b), and (c) show a spherical aberration, astigmatism, and distortion, respectively.
Figures 6B, 6C:
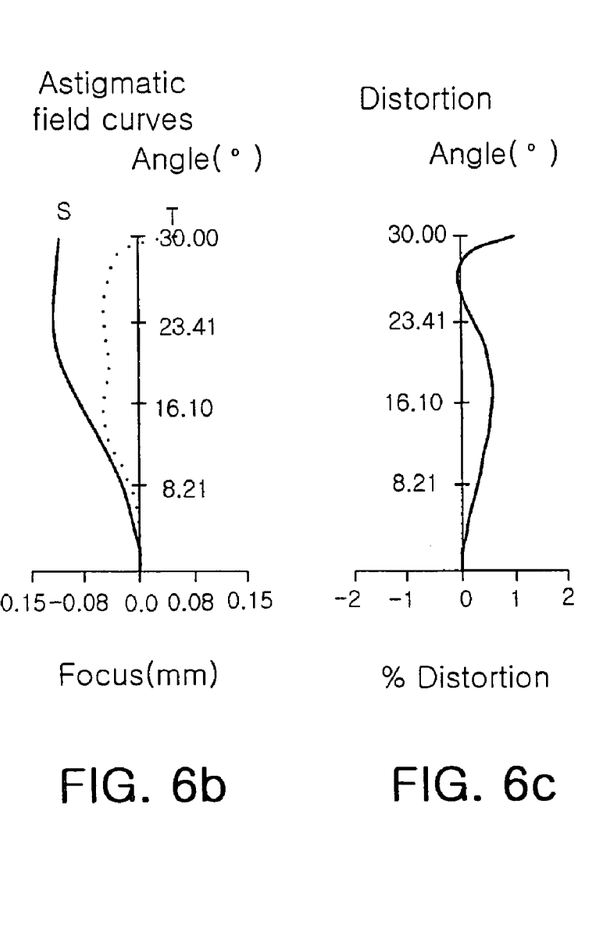

Further, FIG. 5 is a view for a lens construction of a third embodiment of a subminiature optical system according to the present invention, and FIGS. 6A through 6C represent aberrations of an optical system illustrated in table 3 and FIG. 5.

TABLE 3

Focal length (f): 8.00 mm
F number ($F_{No}$): 2.8
Angle of view (2ω): 60°
Length from aperture stop to image plane (TL): 10.913 mm

| Plane No. | Radius of curvature (R) | Thickness or distance (t) | Index of refraction ($N_d$) | Abbe number ($v_d$) | Remark |
|---|---|---|---|---|---|
| S1 | ∞ | 0.473383 | — | — | Aperture stop |
| 1 | 4.68541 | 1.735280 | 1.8042 | 46.5 | 1st lens group |
| 2 | −3.42207 | 0.220000 | 1.8052 | 25.5 | |
| 3 | −20.27096 | 0.545381 | — | — | |
| *4 | −2.30571 | 1.555853 | 1.53 | 56 | 2nd lens group |
| *5 | −3.98218 | 1.285628 | — | — | |
| *6 | −165.36818 | 2.500000 | 1.53 | 56 | 3rd lens group |
| *7 | 42.42071 | 0.670929 | — | — | |
| 8 | ∞ | 0.550000 | 1.5168 | 64.2 | Infrared filter |
| 9 | ∞ | 0.413449 | — | — | |
| 10 | ∞ | 0.550000 | 1.5168 | 64.2 | Cover glass |
| 11 | ∞ | 0.413449 | — | — | |
| 12 | ∞ | 0.000000 | — | — | Image plane |

In table 3, * represents an aspherical surface and aspherical coefficients by the Equation 1 are given as follows. Here, a fourth surface (object side of the third lens), a fifth surface (image side of the third lens), a sixth surface (object side of the fourth lens), and a seventh surface (image side of the fourth lens) are aspherical.

Coefficients of the fourth aspherical surface are given by:
K: −3.572047
A: 0.639488E-02
B: 0.964650E-03
C: −0.399296E-03
D: 0.347037E-04

Coefficients of the fifth aspherical surface are given by:
K: −1.350030
A: 0.316748E-01
B: −0.212523E-02
C: 0.122564E-03
D: 0.918110E-06

Coefficients of the sixth aspherical surface are given by:
K: 2077.550186
A: 0.101994E-01
B: −0.285296E-02
C: 0.317361E-03
D: −0.181305E-04

Coefficients of the seventh aspherical surface are given by:
K: 35.802199
A: 0.984339E-03
B: -0.618583E-03
C: 0.353747E-04
D: -0.113622E-05

[Fourth Embodiment]

Figure 7:
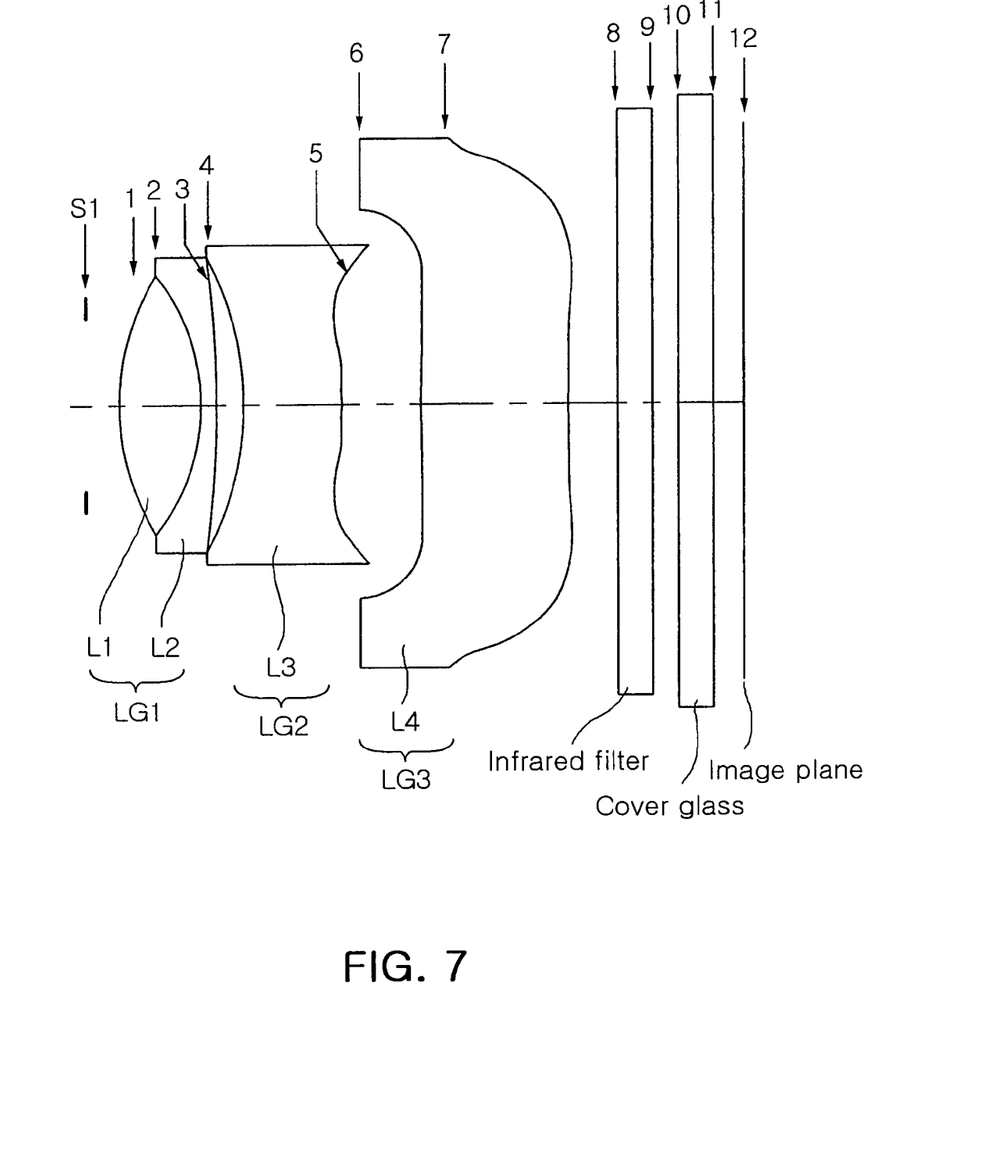
FIG. 7 is a view for a lens construction of a fourth embodiment of a subminiature optical system according to the present invention.
Figure 8A:
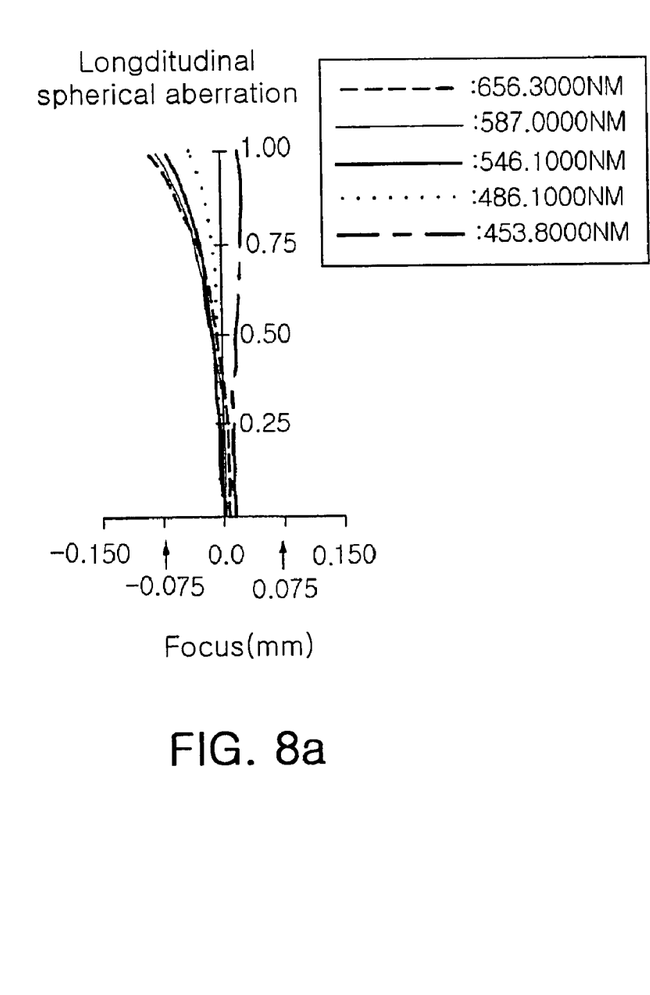
FIG. 8 is a graph explaining aberrations of the fourth embodiment illustrated in FIG. 7, in which (a), (b), and (c) show a spherical aberration, astigmatism, and distortion, respectively.
Figure 8B:
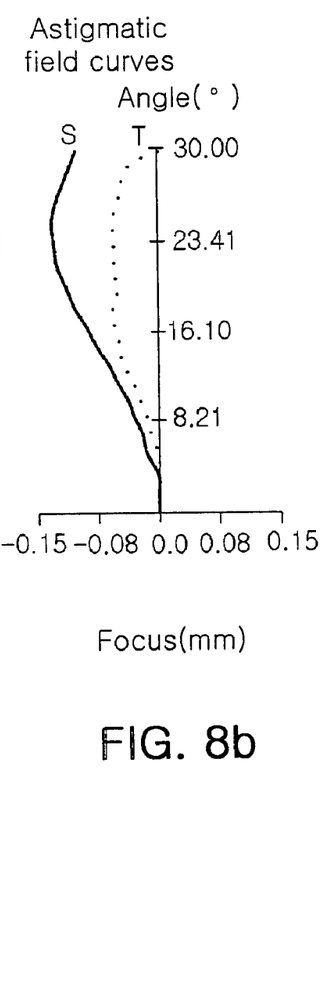
Figure 8C:
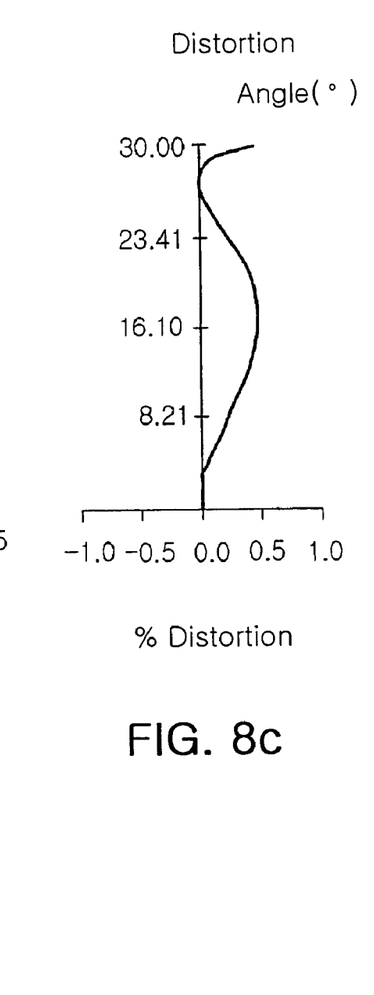

The following table 4 represents numerical examples according to a fourth embodiment of the present invention. Further, FIG. 7 is a view for a lens construction of a fourth embodiment of a subminiature optical system according to the present invention, and FIGS. 8A through 8C represent aberrations of an optical system illustrated in table 4 and FIG. 7.

TABLE 4

Focal length (f): 8.00 mm
F number ($F_{No}$): 2.8
Angle of view (2ω): 60°
Length from aperture stop to image plane (TL): 10.822 mm

| Plane No. | Radius of curvature (R) | Thickness or distance (t) | Index of refraction ($N_d$) | Abbe number ($v_d$) | Remark |
|---|---|---|---|---|---|
| S1 | ∞ | 0.534262 | — | — | Aperture stop |
| 1 | 4.48596 | 1.360375 | 1.8042 | 46.5 | 1st lens group |
| 2 | -3.55885 | 0.220000 | 1.8052 | 25.5 | |
| 3 | -20.36506 | 0.541595 | — | — | |
| *4 | -2.31547 | 1.52093 | 1.53 | 56 | 2nd lens group |
| *5 | -4.51781 | 1.327812 | — | — | |
| *6 | -5717.7170 | 2.500000 | 1.53 | 56 | 3rd lens group |
| *7 | 194.69949 | 0.741485 | — | — | |
| 8 | ∞ | 0.550000 | 1.5168 | 64.2 | Infrared filter |
| 9 | ∞ | 0.484005 | — | — | |
| 10 | ∞ | 0.550000 | 1.5168 | 64.2 | Cover glass |
| 11 | ∞ | 0.484005 | — | — | |
| 12 | ∞ | 0.000000 | — | — | Image plane |

In table 4, * represents an aspherical surface and aspherical coefficients by the Equation 1 are given as follows. Here, a fourth surface (object side of the third lens), a fifth surface (image side of the third lens), a sixth surface (object side of the fourth lens), and a seventh surface (image side of the fourth lens) are aspherical.

Coefficients of the fourth aspherical surface are given by:
K: -3.783783
A: 0.639676E-02
B: 0.927253E-03
C: -0.396950E-03
D: 0.350020E-04

Coefficients of the fifth aspherical surface are given by:
K: -1.754912
A: 0.321142E-01
B: -0.216073E-02
C: 0.117856E-03
D: 0.386248E-05

Coefficients of the sixth aspherical surface are given by:
K: 2363496.8605
A: 0.867101E-02
B: -0.265573E-02
C: 0.307081E-03
D: -0.188411E-04

Coefficients of the seventh aspherical surface are given by:
K: 651.158792
A: 0.119407E-02
B: -0.637938E-03
C: 0.393354E-04
D: -0.134778E-05

The values of the Equations 1 through 8 in the first through the fourth embodiments are given in following table 5.

TABLE 5

| | 1st embodiment | 2nd embodiment | 3rd embodiment | 4th embodiment |
|---|---|---|---|---|
| Equation 1 | 0.7249 | 0.6499 | 0.6125 | 0.5875 |
| Equation 2 | 1.4459 | 1.3426 | 1.3641 | 1.3528 |
| Equation 3 | 0.6165 | 0.5797 | 0.5857 | 0.5608 |
| Equation 4 | 21 | 21 | 21 | 21 |
| Equation 5 | 19.3585 | 2.9705 | 1.8981 | 1.4700 |
| Equation 6 | 0.2834 | 0.2968 | 0.2882 | 0.2894 |
| Equation 7 | 2.7534 | 2.7009 | 7.8955 | 44.2125 |
| Equation 8 | 1.4870 | 1.7992 | 5.3026 | 24.3374 |

As revealed in table 5, the first through fourth embodiments of the present invention satisfy the Equations 1 through 8.

As described above, a subminiature optical system of a high resolution and having a compact-sized lens construction whose number of lens combinations is small can be obtained.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A subminiature optical system having an aperture stop arranged closest to an object side, comprising, sequentially from the object side:
a first lens group having a first lens of plus refractive power and a second lens of minus refractive power, the second lens being cemented to the first lens;
a second lens group having a third lens where at least one refraction surface is aspherical and has minus refractive power; and
a third lens group having a fourth lens where at least one refraction surface is aspherical and has minus refractive power,
in which a refractive power of the first lens group satisfies the following Equation 1 and a dimension of an optical axis direction in the whole lens system satisfies the following Equation 2;

$$0.5 < f_I/f < 0.8 \quad \text{Equation 1}$$

$$TL/f < 1.45 \quad \text{Equation 2}$$

where $f_I$: composite focal length of the first lens group
f: composite focal length of the whole lens system
TL: distance from the aperture stop up to an image plane.

2. The system of claim 1, wherein a shape of an object side of the first lens satisfies the following Equation 3, and an abbe number of the first and the second lenses provided to the first lens group satisfies the following Equation 4;

$$0.55 < r_{I\text{-}1}/f < 0.65 \quad \text{Equation 3}$$

$$10 < v_{I\text{-}1} - v_{I\text{-}2} < 25 \quad \text{Equation 4}$$

where $r_{I-1}$: radius of curvature of an object side of the first lens $v_{I-1}$: abbe number of the first lens $v_{I-2}$: abbe number of the second lens.

3. The system of claim 2, wherein a refractive power of the second lens group satisfies the following Equation 5 and a shape of an object side of the third lens provided to the second lens group satisfies the following Equation 6;

$$1<|f_{II}|/f<20 \qquad \text{Equation 5}$$

$$0.2<|r_{II-1}|/f<0.5 \qquad \text{Equation 6}$$

where $f_{II}$: composite focal length of the second lens group ($f_{II}<0$)

$r_{II-1}$: radius of curvature of an object side of the third lens ($r_{II-1}<0$).

4. The system of claim 2, wherein a refractive power of the third lens group satisfies the following Equation 7 and a shape of an object side of the fourth lens provided to the third lens group satisfies the following Equation 8;

$$1<|f_{III}|/f<50 \qquad \text{Equation 7}$$

$$1<r_{III-2}/f<25 \qquad \text{Equation 8}$$

where $f_{III}$: composite focal length of the third lens group ($f_{III}<0$)

$r_{III-2}$: radius of curvature of an upper side of the fourth lens.

5. The system of claim 3, wherein a refractive power of the third lens group satisfies the following Equation 7 and a shape of an object side of the fourth lens provided to the third lens group satisfies the following Equation 8;

$$1<|f_{III}|/f<50 \qquad \text{Equation 7}$$

$$1<r_{III-2}/f<25 \qquad \text{Equation 8}$$

where $f_{III}$: composite focal length of the third lens group ($f_{III}<0$)

$r_{III-2}$: radius of curvature of an upper side of the fourth lens.

6. The system of claim 1, wherein a refractive power of the second lens group satisfies the following Equation 5 and a shape of an object side of the third lens provided to the second lens group satisfies the following Equation 6;

$$1<|f_{II}|/f<20 \qquad \text{Equation 5}$$

$$0.2<|r_{II-1}|/f<0.5 \qquad \text{Equation 6}$$

where $f_{II}$: composite focal length of the second lens group ($f_{II}<0$)

$r_{II-1}$: radius of curvature of an object side of the third lens ($r_{II-1}<0$).

7. The system of claim 1, wherein a refractive power of the third lens group satisfies the following Equation 7 and a shape of an object side of the fourth lens provided to the third lens group satisfies the following Equation 8;

$$1<|f_{III}|/f<50 \qquad \text{Equation 7}$$

$$1<r_{III-2}/f<25 \qquad \text{Equation 8}$$

where $f_{III}$: composite focal length of the third lens group ($f_{III}<0$)

$r_{III-2}$: radius of curvature of an upper side of the fourth lens.

8. The system of claim 6, wherein a refractive power of the third lens group satisfies the following Equation 7 and a shape of an object side of the fourth lens provided to the third lens group satisfies the following Equation 8;

$$1<|f_{III}|/f<50 \qquad \text{Equation 7}$$

$$1<r_{III-2}/f<25 \qquad \text{Equation 8}$$

where $f_{III}$: composite focal length of the third lens group ($f_{III}<0$)

$r_{III-2}$: radius of curvature of an upper side of the fourth lens.

* * * * *